(12) United States Patent
Bouchard (10) Patent No.: US 7,906,913 B2
(45) Date of Patent: Mar. 15, 2011

(54) LOW LOSS INPUT CHANNEL DETECTION DEVICE FOR A DIRECT CURRENT POWERED LIGHTING SYSTEM

(75) Inventor: Guy P. Bouchard, Beverly, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 588 days.

(21) Appl. No.: 12/105,921

(22) Filed: Apr. 18, 2008

(65) Prior Publication Data

US 2009/0261732 A1    Oct. 22, 2009

(51) Int. Cl.
H05B 37/02    (2006.01)
(52) U.S. Cl. .................. 315/82; 315/224; 315/307
(58) Field of Classification Search .............. 315/82, 315/83, 77, 76, 224, 307, 308, 246, 247, 315/209 R
See application file for complete search history.

(56) References Cited

U.S. PATENT DOCUMENTS

| | | | |
|---|---|---|---|
| 7,688,002 B2 * | 3/2010 | Ashdown et al. | 315/291 |
| 7,710,050 B2 * | 5/2010 | Preston et al. | 315/312 |
| 2004/0036418 A1 | 2/2004 | Rooke et al. | |
| 2005/0057162 A1 | 3/2005 | Kover, Jr. et al. | |
| 2010/0052569 A1 * | 3/2010 | Hoogzaad et al. | 315/294 |

FOREIGN PATENT DOCUMENTS

WO    2006/063552 A1    6/2006

OTHER PUBLICATIONS

International Search Report for PCT Application No. PCT/US2009/039306 dated Jun. 30, 2010, 7 pages.

* cited by examiner

Primary Examiner — David Hung Vu
(74) Attorney, Agent, or Firm — Shaun P. Montana (57) ABSTRACT

A device used with a direct current power source for energizing a lamp. The device includes a plurality of input channels selectively connected to the power source for providing current to the lamp. For each input channel, the device includes a corresponding current sensing component connected to the input channel, and a corresponding bypass switch connected in parallel with the current sensing component. Each current sensing component produces a measurable signal as a function of current that is provided by the corresponding input channel. The device includes a controller connected to the current sensing components and the bypass switches. The controller identifies the input channel that is providing current to the lamp as a function of the measurable signals and controls the bypass switches based on the identified input channel. Particularly, the controller operates each bypass switch in a closed mode when the corresponding input channel is the identified channel so that current provided by the corresponding identified input channel bypasses the current sensing component.

23 Claims, 5 Drawing Sheets

LOW LOSS INPUT CHANNEL DETECTION DEVICE FOR A DIRECT CURRENT POWERED LIGHTING SYSTEM

BACKGROUND

The invention relates generally to an input channel detection device for use with a lighting system. More particularly, the invention relates to a detection device for use with a headlamp system of a motor vehicle.

Current headlamp systems include a battery (broadly, power source), an input selection switch for allowing a user to select between the high beam and low beam operation modes, a high beam input channel, a low beam input channel, and one or more headlamps (e.g., a driver side headlamp and a passenger side headlamp). Each headlamp has a low beam lamp element and a high beam lamp element. When the user selects the high beam operation mode via the input selection switch, the high beam input channel is connected to the battery to provide current to the headlamps for energizing the high beam lamp element. Similarly, when the user selects the low beam operation mode via the input selection switch, the low beam input channel is connected to the battery to provide current to the headlamps for energizing the low beam lamp element.

When an electronic power regulation module is used with the current headlamp system, a detection device must be used in order to detect which input channel is supplying power so that the headlamps may be operated in the appropriate high beam or low beam mode. For example, an OR'ing diode or a resistor may be inserted into each input channel. The voltage on the power supply side of each diode or resistor may be monitored to determine which line is supplying the power. However, the addition of the detection component results in significant power loss.

SUMMARY

Embodiments of the invention improve the efficiency of multi-input lighting systems by minimizing the voltage drop and power loss which has been associated with detecting an input power supply channel that is selected for energizing a light source. Additionally, an embodiment of the invention provides a detection device having reverse polarity protection and overvoltage protection for components of the detection device.

Other objects and features will be in part apparent and in part pointed out hereinafter.

BRIEF DESCRIPTION OF THE DRAWINGS

Corresponding reference characters indicate corresponding parts throughout the drawings.

DESCRIPTION

Embodiments of the invention include a device (hereinafter referred to as the "detection device") for use with a lighting system, such as a headlamp system of a motor vehicle, for detecting a power supply channel (broadly, "input channel") that is selected for energizing a light source (hereinafter referred to as "lamp"). The detection device is configured to minimize voltage drop and power loss which may result from detecting the power supply channel. Additionally, an embodiment of the detection device provides reverse polarity protection and overvoltage protection for components of the detection device.

Figure 1:
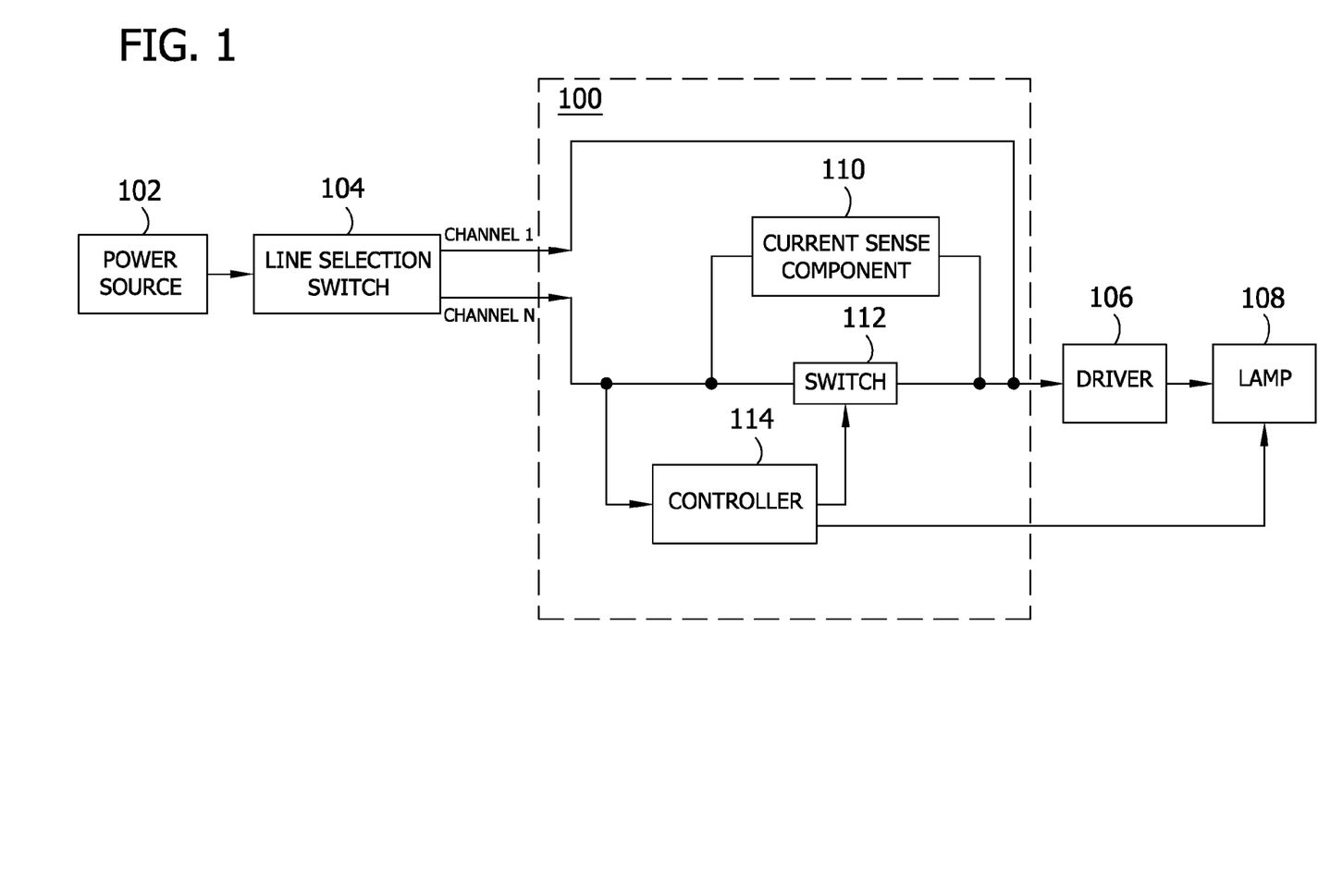
FIGS. 1-3 are a block diagrams illustrating detection devices used with a lighting system to energize a lamp according to embodiments of the invention.
Figure 2:
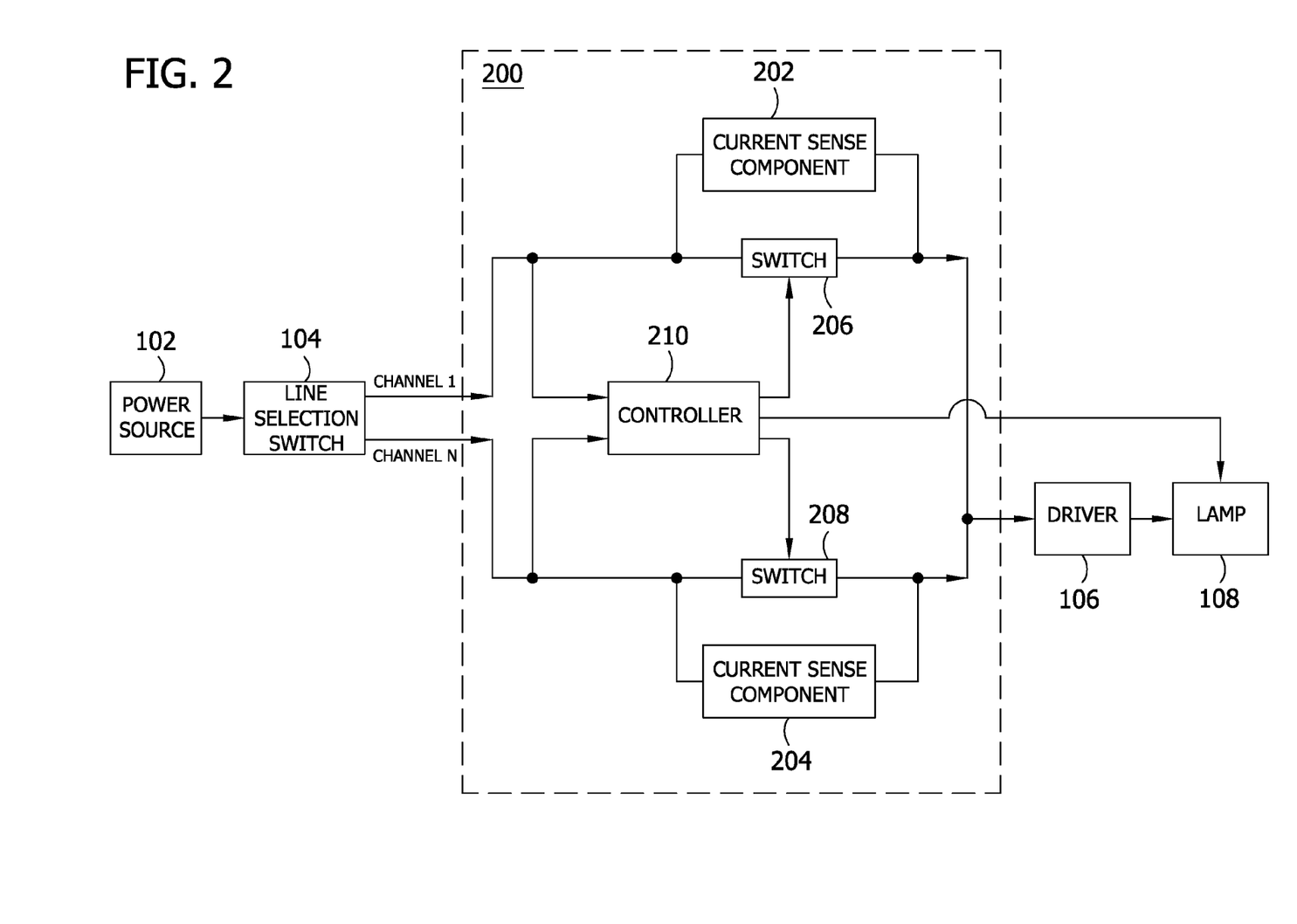
Figure 3:
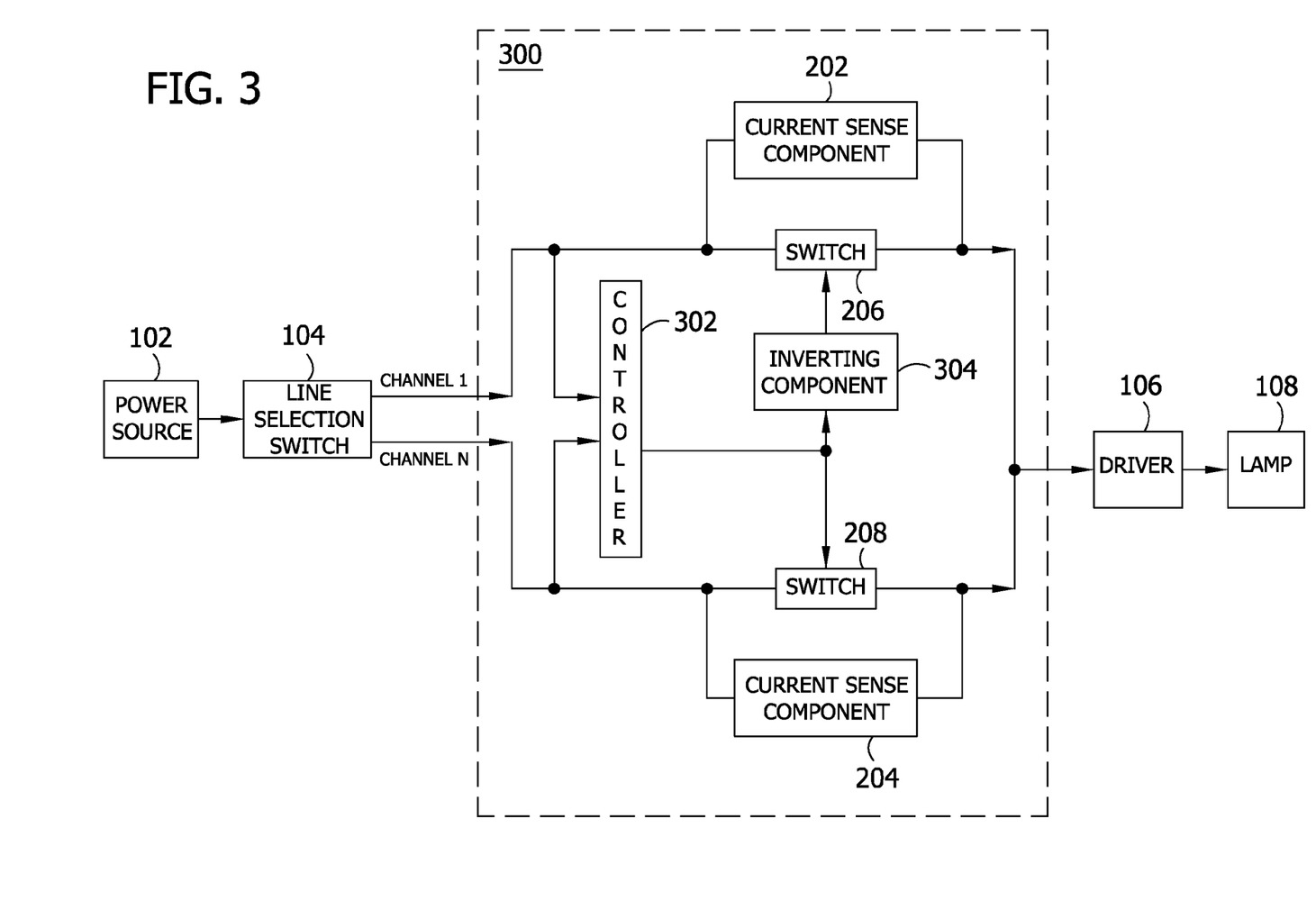

Referring to FIGS. 1, 2, and 3, detection devices are used with a lighting system having a direct current (DC) power source, an input selection switch, a plurality of input channels (channel 1 . . . channel N) and a lamp. The input selection switch may have a user interface for allowing a user to select the input channel. The input selection switch connects the power source to a selected one of the plurality of input channels. The selected input channel provides power to the lamp for energizing the lamp. The lighting system may also include a driver connected between the input channel and the lamp for regulating the power provided to the lamp via the selected input channel.

For example, the lighting system may be a headlamp system of a motor vehicle which may be operated in a high beam mode or a low beam mode. The headlamp system includes a battery (broadly, power source), an input selection switch for allowing a user to select between the high beam and low beam operation modes, a high beam input channel, a low beam input channel, and one or more headlamps (e.g., a driver side headlamp and a passenger side headlamp). Each headlamp has one or more low beam lamp elements ("low beam lamp element") and one or more high beam lamp elements ("high beam lamp element"). For example, each of the headlamps may be one or more light emitting diodes (LEDs) or high-intensity discharge lamps. When the user selects the high beam operation mode via the input selection switch, the high beam input channel is connected to the battery to provide current to the headlamps for energizing the high beam lamp element. Similarly, when the user selects the low beam operation mode via the input selection switch, the low beam input channel is connected to the battery to provide current to the headlamps for energizing the low beam lamp element.

FIG. 1 illustrates an exemplary detection device 100 used with a lighting system to energize a lamp according to an embodiment of the invention. For convenience, the detection device 100 is illustrated and described herein as including a first input channel (illustrated as channel 1) and a second input channel (illustrated as channel N). However, the detection device 100 may include more than two input channels and is not limited to having a particular number of input channels. The first and second input channels are mutually exclusively connected by the line selection switch 104 to the power source 102 for providing current to the lamp 108 for energizing the lamp 108. In particular, the first input channel is selectively connected to the power source 102 for providing current to the lamp 108 for operating the lamp 108 in a first operating mode or the second input channel is selectively connected to the power source 102 for providing current to the lamp 108 for operating the lamp 108 in a second operating mode. In one embodiment, the input selection switch 104 of the lighting system may be additionally configured for selectively disconnecting both input channels from the power source 102 so that no current is provided to the lamp 108 and the lamp 108 operates in an "off" mode.

A current sensing component 110 is connected to at least one of the input channels, such as the second input channel, between the power source 102 and the lamp 108 for producing a measurable signal indicative of (i.e., a function of) the current provided to lamp driver 106 by the second input channel. In one embodiment, the current sensing component 110 is a diode and the measurable signal is a voltage signal measured on the power source 102 side of the diode. As explained in detail below, the measurable signal is used to determine (e.g., identify, detect) which of the input channels (e.g., the first input channel, second input channel) is providing current to the lamp 108 so that the lamp 108 can be operated in the appropriate (e.g., selected) operating mode. It is to be understood that additional or alternative current sensing components (e.g., resistor, transformer) and corresponding measurable signals may be used for detecting the input channel.

In the illustrated embodiment, a bypass switch 112 is connected to the second input channel in parallel with the current sensing component 110. In one embodiment, the bypass switch 112 is a p-type metal-oxide-semiconductor field-effect transistor (MOSFET). The current sensing component 110 may be an intrinsic body diode of the MOSFET. In another embodiment, other types of transistors or switches known in the art may be used. The bypass switch 112 has a closed mode in which it is closed circuited and conducts and an open mode in which it is open circuited and does not conduct. The bypass switch 112 operates in the open mode when the second input channel is not determined to be providing current to the lamp 108. The bypass switch 112 operates in the closed mode when the second input channel is determined to be providing the current to the lamp 108. In the closed mode, the bypass switch 112 conducts the current provided by the second input channel so that the current bypasses the current sensing component 110 and is delivered to the lamp 108. By bypassing the current sensing component 110 in the closed mode, the bypass switch 112 reduces the voltage drop and the power dissipated in delivering power from the power source 102 to the lamp 108 via the second input channel. In the open mode, the bypass switch 112 does not conduct the current provided by the second input channel so that no current is delivered to the driver and the lamp 108 via the current sensing component 110.

A controller 114 (e.g., microcontroller 114, microprocessor, programmable logic controller 114) is connected via a controller 114 input to the power source 102 side of the current sensing component 110 for monitoring/receiving the measurable signal produced as a function of current being provided by the second input channel and the current sensing component 110. For example, the measurable signal having a value at or near 0 Volts (or other pre-determined voltage which is less than the voltage as supplied from the power source) measured at the indicates that no current is flowing in the second input channel and thus the second input channel is not providing current to the lamp 108. Accordingly, when the measurable signal has a value of 0 Volts, the controller 114 identifies that the first input channel may be providing current to the lamp 108. The measurable signal having a pre-determined value greater than zero indicates that current is flowing in the second input channel and thus the second input channel is providing current to the lamp 108. Accordingly, when the measurable signal has a value in a particular range of the pre-determined value, the controller 114 identifies that the second input channel is providing current to the lamp 108.

The controller 114 is connected via a controller output to the bypass switch 112 for controlling the mode of the bypass switch 112 based on the identified input channel. In particular, the controller 114 provides a switch control signal to the bypass switch 112 via the controller 114 output which controls the mode of the bypass switch 112. In one embodiment, the controller 114 is configured to maintain the bypass switch 112 in the open mode unless the controller 114 determines that the second input channel is providing current to the lamp 108. Thus, the controller 114 monitors the measurable signal and provides a switch control signal to the bypass switch 112 for maintaining the bypass switch 112 in the open mode until the measurable signal indicates that the second input channel is providing current to the lamp 108 (e.g., the value of the measurable signal changes from 0 V to the predetermined value) upon which the controller 114 provides a switch control signal to the bypass switch 112 to operate the bypass switch 112 in the closed mode.

In one embodiment, the controller is configured to periodically reassess the identified input channel. In particular, after the bypass switch 112 has been operating in the closed mode for a defined period of time, the controller briefly opens the bypass switch 112 (i.e., operates the bypass switch in the open mode) to determine whether the second channel is still providing current to the lamp 108. The measurable signal is monitored during the brief open mode operation. When the value of the measurable signal drops to 0 V, the controller 114 determines that the second input channel is no longer providing current to the lamp 108 and provides a signal to operate the bypass switch 112 in the open mode.

In one embodiment, the controller 114 is also connected via another controller 114 output to the lamp 108 for controlling the operating mode of the lamp 108 when the lamp 108 is receiving current via an input channel. In one example, the first and second channels are connected to anode of lamp 108 via the driver for providing the current needed to operate the lamp 108 in the first or second operating mode, respectively. The controller 114 provides a lamp 108 control signal to the lamp 108 to indicate (i.e., control, select) the operating mode of the lamp 108 based on the input channel that was identified by the controller 114 as providing the current. For example, the lamp 108 may include first set of one or more components (e.g., lamp 108 element(s) of a lamp 108, one or more lamp 108s, a current limiter) that are activated for operating in the first operating mode and a second set of components (which may include one or more elements from the first set of components) that are activated for operating in a second mode. The controller 114 provides a lamp 108 control signal to the lamp 108 to control which set of components is to receive the current based on the input channel identified as providing the current. If neither input channel is actually providing current to the lamp 108 (e.g., "off" operating mode), the lamp 108 will not be energized regardless of the lamp 108 control signal since the lamp 108 control signal does not provide power for energizing the lamp 108. For instance, if the controller 114 identifies the first input channel as providing current to the lamp 108 because the measurable signal value is 0V, and indicates that the operating mode is the first operating mode via the control signal, the lamp 108 still operates in the appropriate operating mode ("off" operating mode) since the lamp 108 does not receive current for energizing the lamp 108.

In one embodiment, the detection device 100 may include a control switch (not illustrated), such as a transistor, connected between the controller 114 output and the bypass switch 112 for adjusting the control signal for operating the bypass switch 112. For example, the controller 114 may be configured to generate a control signal having a low current or voltage value when the controller 114 determines that the bypass switch 112 should be operated in the open mode and to generate a control signal having a high current or voltage value when the controller 114 determines that the bypass switch 112 should be operated in the closed mode. The control switch operates in an open mode when it receives the control signal having the low value and operates in a closed mode when it receives the control signal having the high value. Accordingly, the control switch modifies the control signal to have a value of zero when the controller 114 determines that the bypass switch 112 should be operated in the open mode since the control switch does not conduct the control signal.

In one embodiment, the detection device 100 may include an over voltage component (not illustrated) for regulating high voltage signals (broadly "electrical signals") from being received by the bypass switch 112. For example, the detection device 100 may include a diode (e.g., Zener diode) connected across the bypass switch 112 from the controller 114 side of the bypass switch 112 to the driver 106 side of the bypass switch 112. The diode protects the bypass switch 112 from receiving potentially damaging high voltage signals which may be generated between the controller 114 and the switch.

In one embodiment, the first input line may be used for providing power to the lamp for energizing the lamp in a plurality of operating modes. The second input line may be used for controlling the lamp to operate according to one of the plurality of operation modes of the lamp.

FIG. 2 illustrates an exemplary detection device 200 used with a lighting system to energize a lamp 108 according to another embodiment of the invention. The first and second input channels are selectively connected by the input selection switch 104 to the power source 102 for providing current to the lamp 108 for energizing the lamp 108. In particular, the first input channel is connected to the power source 102 for providing current to the lamp 108 for operating the lamp 108 in a first operating mode and the second input channel is connected to the power source 102 for providing current to the lamp 108 for operating the lamp 108 in a second operating mode.

A first current sensing component 202 is connected to the first input channel between the power source 102 and the lamp 108 for producing a first measurable signal as a function of the current provided by the first input channel. A second current sensing component 204 is connected to the second input channel between the power source 102 and the lamp 108 for producing a second measurable signal as a function of the current provided by the second input channel. In one embodiment, the current sensing component 110 is a diode and the measurable signal is a voltage signal measured on the power source 102 side of the diode. As explained in detail below, the measurable signal is used to determine (e.g., identify, detect) which of the input channels (e.g., the first input channel, second input channel) is providing current to the lamp 108 so that the lamp 108 can be operated in the appropriate (e.g., selected) operating mode. It is to be understood that additional or alternative current sensing components (e.g., resistor, transformer) and corresponding measurable signals may be used for detecting the input channel.

In the illustrated embodiment, a first bypass switch 206 is connected to the first input channel in parallel with the first current sensing component 202. Similarly, a second bypass switch 208 is connected to the second input channel in parallel with the second current sensing component 204. In one embodiment, the first and second bypass switches 206, 208 are p-type metal-oxide-semiconductor field-effect transistors (MOSFETs). The first and second current sensing components may each be an intrinsic body diode of the corresponding MOSFET. In another embodiment, the first and/or second bypass switch may include another type of transistor or switch known in the art. Each of the bypass switches 206, 208 has an open mode and a closed mode. The first bypass switch 206 operates in the open mode when the first input channel is not determined to be providing current to the lamp 108. Likewise, the second bypass switch 208 operates in the open mode when the second input channel is not determined to be providing current to the lamp 108. The first bypass switch 206 operates in the closed mode when the first input channel is determined to be providing the current to the lamp 108. Likewise, the second bypass switch 208 operates in the closed mode when the second input channel is determined to be providing the current to the lamp 108. In the closed mode, the first and second bypass switches, 206 and 208, conduct current being provided by the respective first or second input channel so that the current bypasses the respective current sensing component 202, 204 and is delivered to the lamp 108. By bypassing the current sensing components 202, 204, the bypass switches reduce the voltage drop and the power dissipated in delivering power from the power source 102 to the lamp 108 via the input channels.

A controller 210 (e.g., microcontroller, microprocessor, programmable logic controller 210) is connected via a first controller 210 input to the power source 102 side of the first current sensing component 202 for monitoring/receiving the first measurable signal produced as a function of current being provided by the first input channel and the first current sensing component 202. The controller 210 is also connected via a second controller 210 input to the power source 102 side of the second current sensing component 204 for monitoring/receiving the second measurable signal produced as a function of current being provided by the second input channel and the second current sensing component 204. For example, the first or second measurable signal having a value of 0 Volts (or other pre-determined voltage which is less than the voltage as supplied from the power source) indicates that no current is flowing in the respective first or second input channel. Accordingly, when the first measurable signal has a value of 0 Volts, the controller 210 is configurable to determine that the first input channel is not providing current to the lamp 108. Likewise, when the second measurable signal has a value of 0 Volts, the controller 210 is configurable to determine that the second input channel is not providing current to the lamp 108. The first or second measurable signal having a pre-determined value greater than zero indicates that current is flowing in the respective first or second input channel. Accordingly, when the first measurable signal has a value in a particular range of a first pre-determined value, the controller 210 identifies that the first input channel is providing current to the lamp 108. Likewise, when the second measurable signal has a value in a particular range of a second pre-determined value, the controller 210 identifies that the second input channel is providing current to the lamp 108.

The controller 210 is connected via a controller 210 output to the bypass switches for controlling the modes of the bypass switches based on the identified input channel. According to the illustrated detection device 200, the controller 210 is connected via first and second controller 210 outputs to the first and second bypass switches 206, 208, respectively. The controller 210 provides a first switch control signal to the first bypass switch 206 via the first controller 210 output for controlling the mode of the first bypass switch 206. Likewise, the controller 210 provides a second switch control signal to the second bypass switch 208 via the second controller 210 output for controlling the mode of the second bypass switch 208. In one embodiment, the controller 210 is configured to maintain each of the bypass switches in the open mode unless the controller 210 determines that the input channel connected to the bypass switch is providing current to the lamp 108.

In one embodiment, the first and second input channels are mutually exclusively connected to the power source. Accordingly, the controller 210 monitors the first and second measurable signals and provides first and second switch control signals, respectively, to the first and second bypass switches 206, 208 for maintaining the bypass switches 206, 208 in the open mode unless the first measurable signal indicates that the first input channel is providing current to the lamp 108 (e.g., the value of the first measurable signal changes from 0 V to the first predetermined value) or unless the second measurable signal indicates that the second input channel is providing current to the lamp 108 (e.g., the value of the second measurable signal changes from 0 V to the first predetermined value). Responsive to such an indication by the first measurable signal, the controller 210 provides a first switch control signal to the first bypass switch 206 to operate the first bypass switch 206 in the closed mode. Additionally, the controller 210 provides a second switch control signal to the second bypass switch 208 to operate the second bypass switch 208 in open mode. The first bypass switch 206 and the second bypass switch 208 are maintained in the closed mode and open mode, respectively, unless the second measurable signal indicates that the second input channel is providing current to the lamp 108. Responsive to such an indication, the controller 210 provides a first switch control signal to operate the first bypass switch in the open mode and provides a second switch control signal to operate the second bypass switch in the closed mode. The controller 210 is configured for performing operations for the second input channel and components connected thereto which respectively correspond to the operations described in this paragraph for the first input channel and first input channel components.

In another embodiment, the first and second input channels can be concurrently connected to the power source. Accordingly, the controller 210 monitors the first measurable signals and provides first switch control signal to the first bypass switch 206 for maintaining the first bypass switches 206 in the open mode unless the first measurable signal indicates that the first input channel is providing current to the lamp 108 (e.g., the value of the first measurable signal changes from 0 V to the first predetermined value). Responsive to such an indication, the controller 210 operates the first bypass switch 206 in the closed mode. The controller is configured to periodically reassess the identified input channel. Thus, after the first bypass switch 206 has been operating in the closed mode for a defined period of time, the controller briefly opens the bypass switch 206 (i.e., operates the bypass switch in the open mode) to determine whether the first channel is still providing current to the lamp 108. The first measurable signal is monitored during the brief open mode operation. When the value of the measurable signal drops to 0 V, the controller 114 determines that the second input channel is no longer providing current to the lamp 108 and provides a signal to operate the first bypass switch 206 in the open mode. The controller 210 is configured for performing operations for the second input channel and components connected thereto which respectively correspond to the operations described in this paragraph for the first input channel and first input channel components.

Referring to a detection device 300 illustrated in FIG. 3, in another embodiment, the controller 302 is connected via a single a controller 302 output to the first and second bypass switches 206, 208 for controlling the modes of the bypass switches based 206, 208 on the identified input channel. In particular, the controller 302 provides a single switch control signal via the controller 302 output for controlling both of the bypass switches 206, 208. An inverting component 304 is connected between the controller 302 and the first bypass switch 206 for receiving the switch control signal, inverting the switch control signal, and providing the inverted switch control signal to the first bypass switch 206. For example, the bypasses switches may be configured so that they operate in the open mode when they receive a low control signal from the controller 302 and operate in the closed mode when they receive a high control signal. Accordingly, when the controller 302 identifies that the first input channel is providing current, the controller 302 generates a switch control signal having a first value (e.g., a low current/voltage value). The inverting component 304 inverts the switch control signal provided to the first bypass switch 206. As such, the first bypass switch 206 receives a switch control signal having a high value and thereby operates in the closed mode. The second bypass switch 208 receives the switch control signal having the first value (e.g., low value) and thereby operates in the open mode. Likewise, when the controller 302 identifies that the second input channel is providing current, the controller 302 generates a switch control signal having a second value (e.g., a high current/voltage value). The inverting component 304 inverts the switch control signal provided to the first bypass switch 206. As such, the first bypass switch 206 receives a switch control signal having a low value and thereby operates in the open mode. The second bypass switch 208 receives the switch control signal having the second value (e.g., high value) and thereby operates in the closed mode.

Referring to FIGS. 2 and 3, in one embodiment, the controller 210, 302, 302 is also connected via another controller output(s) to the lamp 108 for controlling the operating mode of the lamp 108 when the lamp 108 is receiving current via an input channel. In one example, the first and second channels are connected to anode of lamp 108 via the driver 106 for providing the current needed to operate the lamp 108 in the first or second operating mode, respectively. The controller 210, 302 provides a lamp 108 control signal to the lamp 108 to indicate (i.e., control, select) the operating mode of the lamp 108 based on the input channel that was identified by the controller 210, 302 as providing the current. For example, the lamp 108 may include first set of one or more components (e.g., lamp 108 element(s) of a lamp, one or more lamps, a current limiter) that are activated for operating in the first operating mode and a second set of components (which may include one or more elements from the first set of components) that are activated for operating in a second mode. The controller 210, 302 provides a lamp 108 control signal to the lamp 108 to control which set of components is to receive the current based on the input channel identified as providing the current. If neither input channel is actually providing current to the lamp 108 (e.g., "off" operating mode), the lamp 108 will not be energized regardless of the lamp 108 control signal since the lamp 108 control signal does not provide power for energizing the lamp 108. In one embodiment, the controller 210, 302 may additionally indicate that the lamp 108 is to be operated in the "off mode" when the controller 210, 302 determines that neither of the input channels are providing current based on the first and second measurable signals.

In one embodiment, the detection device 200, 300 may include a first and/or second control switch (shown in FIG. 4 and FIG. 5), such as a transistor, connected between the controller output provided for the respective first and/or second bypass switch 208 for adjusting the control signal for operating the bypass switch. For example, the switch control signal may have a low current or voltage value when the controller 210, 302 determines that the bypass switch should be operated in the open mode and the switch control signal may have a high current or voltage value when the controller 210, 302 determines that the bypass switch should be operated in the closed mode. The control switch operates in an open mode when it receives the control signal having the low value and operates in a closed mode when it receives the control signal having the high value. Accordingly, the control switch modifies the switch control signal to have a value of zero for operating the bypass switch in the open mode since the control switch does not conduct the control signal.

In one embodiment, the detection device 200, 300 may include a first and/or second over voltage component (shown in FIG. 4 and FIG. 5) for regulating high voltage signals (broadly "electrical signals") from being received by the respective first and/or second bypass switch 206, 208. For example, the detection device 200 may include a diode (e.g., Zener diode) connected across the bypass switch from the controller side of the bypass switch to the driver 106 side of the bypass switch. The diode protects the bypass switch from receiving potentially damaging high voltage signals which may be generated between the controller 210, 302 and the switch 206, 208.

Although the detection devices 200, 300 have been described as having two input channels, it is to be understood that the detection devices 200, 300 may have greater than two input channels and is not limited to having any particular number of input channels. Each additional channel (hereinafter referred to as "a third channel") is selectively connected the power source 102 for providing current to the lamp 108 or other output device. For example, the first and second input channels may be used to energize a headlamp of motor vehicle and the third input channel may be used to energize a lamp for a vehicular accessory. In another example, the third input channel may be used for providing power to a vehicular speed control device, a windshield wiper control device, a windshield washer device, a turn signal, or other output device associated with the vehicle.

A third current sensing component is connected to the third input channel between the power source 102 and the lamp 108 or output device. The third current sensing component produces a third measurable signal as a function of current provided by the third input channel. A third bypass switch connected to the third input channel in parallel with the third current sensing component. The third bypass switch has an open mode and a closed mode. The third bypass switch has a closed mode for bypassing the third current sensing component and conducting current provided by the third input channel for energizing the lamp or output device.

The controller 210, 302 is connected to the first, second, and third (i.e., additional) current sensing components and the first, second, and third (i.e., additional) bypass switches. The controller 210, 302 identifies the input channel that is providing current as a function of the measurable signals (e.g., first, second, third) and for controlling the mode of the bypass switches based on the identified input channel. In particular, the controller 210, 302 controls each bypass switch to operate in the closed mode when the input channel connected to the bypass switch is the identified channel. The controller 210, 302 controls each bypass switch to maintain the open mode when the input channel connected to the bypass switch is not the identified channel.

Figure 4:
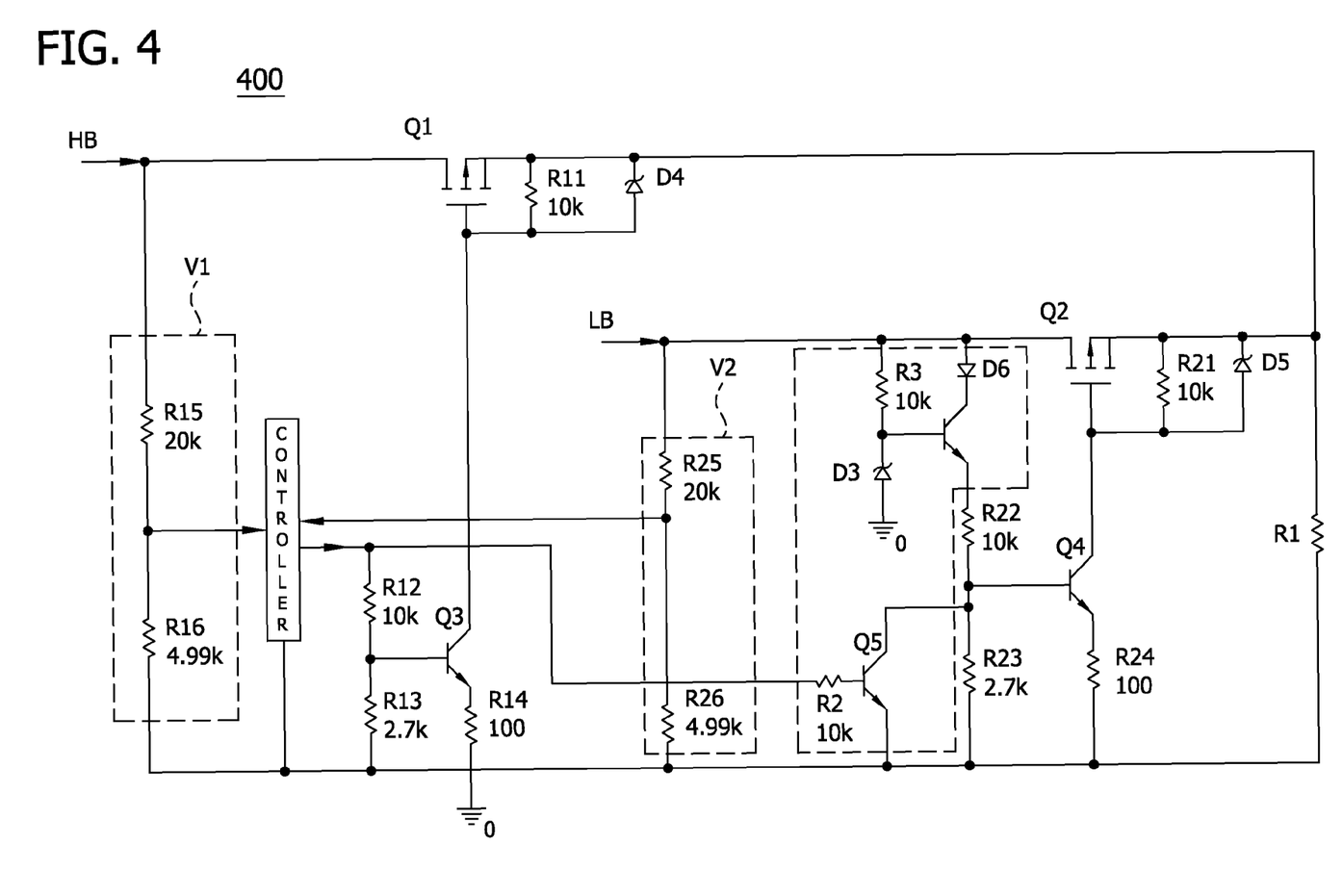
FIG. 4 is a circuit diagram illustrating a detection device for use with a headlamp system to energize a headlamp according to an embodiment of the invention.

As noted above, the detection devices 100, 200, 300 may be used with a headlamp system of a motor vehicle for identifying the input channel providing current to a headlamp and operating the headlamp in a corresponding operation mode. FIG. 4 is a circuit diagram of a detection device 400 as illustrated in FIG. 3 in an embodiment in which the detection device is used with a headlamp system of a motor vehicle for energizing a high beam element or a low beam element of a headlamp. In particular, a high beam input channel HB and a low beam input channel LB are selectively connected via a line selection switch to a power source for providing current to the headlamp. The detection device identifies whether the high beam input channel HB or the low beam channel LB is supplying current and accordingly energizes a high beam element of the headlamp or a low beam element of the headlamp.

A high beam current sensing component (i.e., diode) is connected to the high beam input channel HB and a low beam current sensing component (i.e., diode) is connected to the low beam input channel LB. A microcontroller is connected to the power source side of the high beam and low beam current sensing components. The microcontroller monitors the voltage, via voltage divider components V1 and V2, at the power source side of each of the current sensing components to determine which line is supplying power for the headlamp. Components R15 and R16 form a 5:1 voltage divider V1 for dividing the voltage at the power source side of the high beam current sensing component. Components R25 and R26 similarly form a 5:1 voltage divider V2 for dividing the voltage at the power source side of the low beam current sensing component.

A high beam bypass switch is connected in parallel with the high beam current sensing component (collectively represented as Q1) and a low beam bypass switch is connected in parallel with the low beam current sensing component (collectively represented as Q2). According to the illustrated detection device, Q1 and Q2 are each a p-type metal-oxide-semiconductor field-effect transistors (broadly "bypass switch") having a body diode (broadly "current sensing component"). For example, Q1 and Q2 may be the FDD6637 35V P-Channel Power Trench MOSFETs available from Fairchild Semiconductor Corporation.

When the microcontroller identifies an input channel (i.e., high beam input channel or low beam input channel) that is providing current, the microcontroller provides a switch control signal via a microcontroller output for controlling the operation modes of the high beam and low beam bypass switches. In particular, each bypass switch is operated in the closed mode when the input channel connected to thereto is the identified channel, and each bypass switch is maintained in the open mode when the input channel connected to said bypass switch is not the identified channel. Accordingly, when the high beam input channel is providing current for the headlamp the high beam bypass switch is closed thereby conducting the current so that the current bypasses the high beam current sensing component. Likewise, when the low beam input channel is providing current for the headlamp the low beam bypass switch is closed thereby conducting the current so that the current bypasses the low beam current sensing component. As such, the bypass switches reduce the voltage drop and power loss resulting from passing the current through the current sensing components.

Circuit components D3 R2, D6, R2, and Q5 (collectively referred to as inverter component I1) are connected between the microcontroller and the low beam bypass switch for inverting the switch control signal before it is received by the low beam bypass switch. Circuit components R12, R13, R14, and Q3 (broadly "high beam control switch") are connected between the microcontroller switch output and the high beam bypass switch and drive the gate of the high beam MOSFET (i.e., bypass switch). The components (R12, R13, R14, and Q3) shift the voltage level of the switch control signal for operating the high beam bypass switch according to the determined operating mode. Circuit components R22, R23, R24, and Q4 (broadly "low beam control switch") are connected between the inverter component I1 and drive the gate of the low beam MOSFET (i.e., bypass switch). The components (R22, R23, R24, and Q4) shift the voltage level of the inverted switch control signal for operating the low beam bypass switch according to the determined operating mode. Thus, the inverter component I1 and the gate drive circuitry for the high beam and low beam MOSFETs allow a single microcontroller output (via switch control signal) to simultaneously operate both the high beam and low beam bypass switches in opposite modes (e.g., open mode and closed mode).

The gate drive circuitry for the high beam and low beam MOSFETs also provides input reverse polarity protection by causing the high beam and low beam MOSFTEts to open. The high beam and low beam control switches, Q3 and Q4, are each a bipolar junction transistor (BJT). For example, the control switches may each be the 2N3904 NPN general purpose amplifier and switch available from Fairchild Semiconductor Corporation.

Additional voltage protection is achieved by the current sensing diodes and diodes D4 and D5. The current sensing diodes provide reverse polarity protection by preventing current from flowing toward the power source in each input channel. Diodes D4 (e.g., broadly "high beam overvoltage protection component") and D5 (broadly "low beam overvoltage protection component") are connected between the gate and the drain of the high beam and low beam MOSFETs, respectively. In particular, diodes D4 and D5 are each Zener diodes provide overvoltage protection by preventing the voltage at the gate of the corresponding MOSFET from exceeding 14 V.

Figure 5:
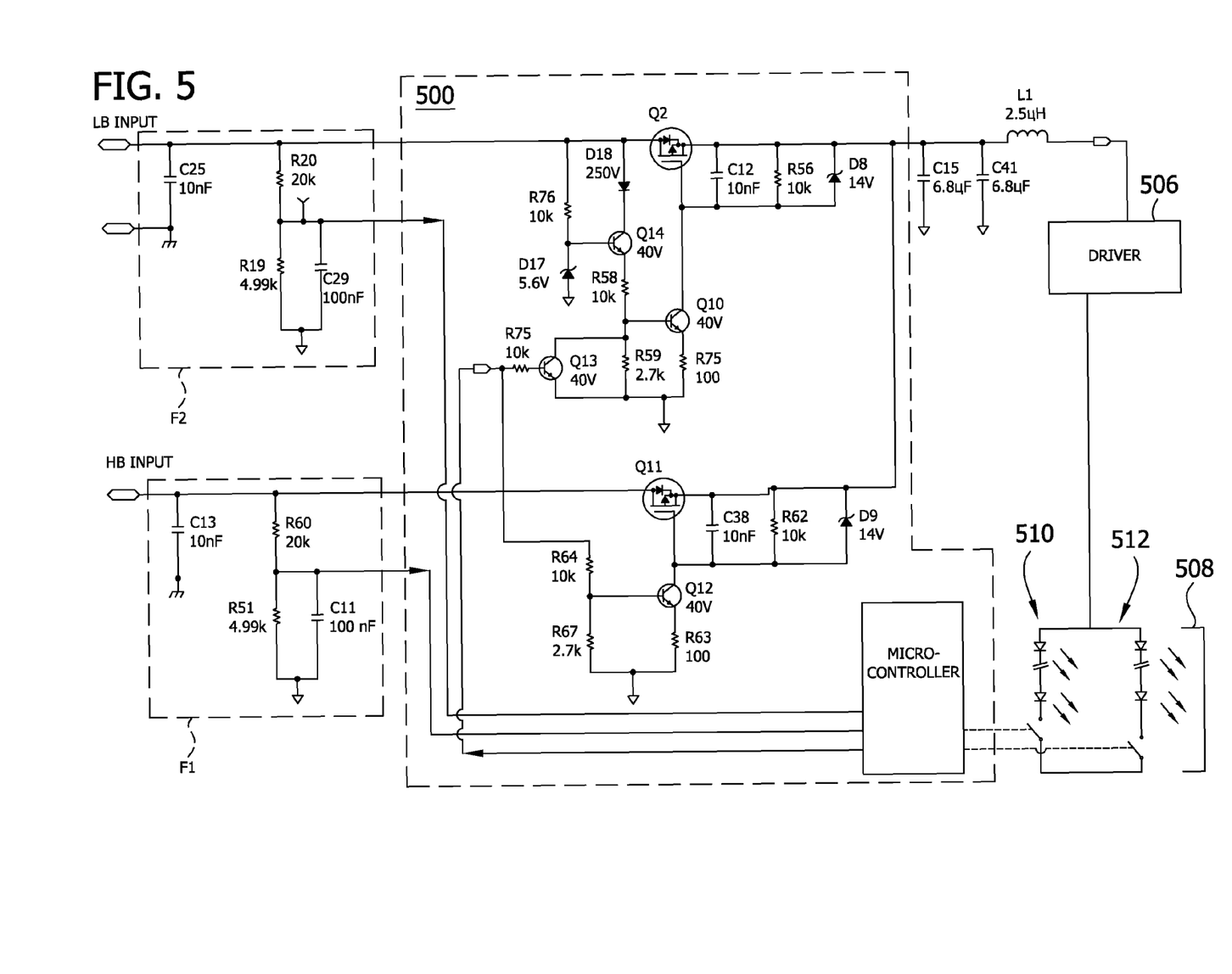
FIG. 5 is a circuit diagram and block diagram illustrating a detection device in connection with a headlamp system for energizing a light emitting diode (LED) headlamp according to an embodiment of the invention.

FIG. 5 is a partial block and circuit diagram of a detection device 500 as described in connection with FIG. 4 and a vehicular headlamp system for use therewith according to an embodiment of the invention. The headlamp system includes a battery (e.g., 12 Volts) and an input line selection switch (not shown). The input line switch connects either the high beam input channel or the low beam input channel to the battery for providing current to the headlamp 508. In the illustrated embodiment, the headlamp 508 is comprised of two sets of light emitting diodes (LEDs). A first set of LEDs includes a first string of LEDs 510 and a second set of LEDs includes the second string of LEDs 512. It is to be understood that the first and second sets of LEDs may include other combinations of the LEDs, including additional strings of LEDs that are not illustrated. For example, the first set of LEDs may include the string of LEDs 510 and the second set of LEDs may include the first and second strings of LEDs 510, 512. Additionally, it is to be understood that the LEDs of the first and second sets are not limited to LEDs arranged in one or more strings. For example, the LEDs may be arranged as a chip, a set of chips packed in a package, a grouping of packaged chips, an array of chips or packages, and/or other configurations.

The current from the battery is filtered (e.g., removing noise, electromagnetic interference) via filtering component F1 or F2 respectively connected to the high beam or low beam input channel. The current is then passed via the input channel through the detection device 500 and additional filtering components L1, C15, and C41 to a driver 506. The driver 506 regulates the current being provided to the LEDs 510, 512 and, specifically, provides constant current to the LEDs 510, 512. For example, the driver may be a constant current LED driver (e.g., A54201B) available from Osram Sylvania. The constant current from the driver 506 is provided to the anode of the headlamp 508.

As discussed in connection with FIG. 4, the detection device 500 identifies whether the high beam input channel or the low beam input channel is providing the current for the headlamp 508 and controls the LEDs 510, 512 accordingly. In particular, the microcontroller has one output for controlling a first string LEDs 510 and another output for controlling a second string of LEDs 512. When the microcontroller identifies that the low beam input channel is providing current for the headlamp 508, the microcontroller closes a switch connected to the first string of LEDs 510 and maintains open a switch connected to the second string of LEDs 512 in order to energize the first set of LEDs 510 and thereby operate the headlamp 508 in low beam operating mode. When the microcontroller identifies that the high beam input channel is providing current for the headlamp 508, the microcontroller maintains open the switch connected to the first string of LEDs 510 and closes the switch connected to the second string of LEDs 512 in order to energize the second set of LEDs 512 and thereby operate the headlamp in high beam operating mode.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the constructions, products, and methods] without departing from the scope of the invention, it is intended that all matter contained in the above description and shown in the accompanying drawings shall be interpreted as illustrative and not in a limiting sense.

What is claimed is:

1. A device used with a direct current power source for energizing a lamp, said device comprising:
    a first and second input channel, each input channel being selectively connected the power source for providing current to the lamp for energizing said lamp;
    a current sensing component connected to the second input channel between the power source and the lamp, said current sensing component producing a measurable signal as a function of current provided by the second input channel;
    a bypass switch connected to the second input channel in parallel with the current sensing component, said bypass switch having an open mode, and said bypass switch having a closed mode for bypassing the current sensing component and conducting current provided by the second input channel for energizing the lamp; and
    a controller connected to the current sensing component and the bypass switch, said controller identifying the input channel that is providing current to the lamp as a function of the measurable signal and for controlling the mode of the bypass switch based on the identified input channel wherein the controller operates the bypass switch in the closed mode when the second input channel is the identified input channel and wherein the controller operates the bypass switch in the open mode when the first input channel is the identified input channel.

2. The device of claim 1 further comprising:
    a third input channel being selectively connected the power source for providing current to the lamp for energizing said lamp;
    an additional current sensing component connected to the third input channel between the power source and the lamp, said additional current sensing component producing an additional measurable signal as a function of current provided by the third input channel; and an additional bypass switch connected to the third input channel in parallel with the additional current sensing component, said additional bypass switch having an open mode, and said additional bypass switch having a closed mode for bypassing the additional current sensing component and conducting current provided by the third input channel for energizing the lamp;

wherein said controller is connected to the current sensing component and the bypass switch and to the additional current sensing component and the additional bypass switch, said controller identifying the input channel that is providing current to the lamp as a function of the measurable signal and the additional measurable signal and for controlling the mode of each bypass switch based on the identified input channel wherein the controller operates each bypass switch in the closed mode when the input channel connected to said bypass switch is the identified input channel and wherein the controller operates each bypass switch in the open mode when the input channel connected to said bypass channel is not the identified input channel.

3. A device used with a direct current power source for energizing a lamp, said device comprising:

a first and second input channel, each input channel being selectively connected to the power source for providing current to the lamp for energizing said lamp;

a first current sensing component connected to the first input channel between the power source and the lamp, said first current sensing component producing a first measurable signal as a function of current provided by the first input channel;

a second current sensing component connected to the second input channel between the power source and the lamp, said second current sensing component producing a second measurable signal as a function of current provided by the second input channel;

a first bypass switch connected to the first input channel in parallel with the first current sensing component, said first bypass switch having an open mode, and said bypass switch having a closed mode for bypassing the first current sensing component and conducting current provided by the first input channel for energizing the lamp;

a second bypass switch connected to the second input channel in parallel with the second current sensing component, said bypass switch having an open mode, and said bypass switch having a closed mode for bypassing the second current sensing component and conducting current provided by the second input channel for energizing the lamp; and a controller connected to the first and second current sensing components and the first and second bypass switches, said controller identifying the input channel that is providing current to the lamp as a function of the first and second measurable signals and for controlling the mode of the first and second bypass switches based on the identified input channel wherein the controller operates each bypass switch in the closed mode when the input channel connected to said bypass switch is the identified channel and wherein the controller maintains each bypass switch in the open mode when the input channel connected to said bypass switch is not the identified channel.

4. The device of claim 3 wherein the first and second input channels are mutually exclusively connected to the power source for providing current to the lamp for energizing said lamp.

5. The device of claim 3 wherein the first and second input channels are concurrently connected to the power source for providing current to the lamp for energizing said lamp.

6. The device of claim 3 wherein the lamp includes a plurality of lamp elements and said first input channel is selectively connected to the power source for providing current to the lamp for energizing a first set of the plurality of lamp elements and said second input channel is selectively connected to the power source for providing current to the lamp for energizing a second set of the plurality of lamp elements.

7. The device of claim 3 further comprising:

a third channel being selectively connected to the power source for providing current to the lamp for energizing said lamp;

a third current sensing component connected to the third input channel between the power source and the lamp, said third current sensing component producing a third measurable signal as a function of current provided by the third input channel; and a third bypass switch connected to the third input channel in parallel with the third current sensing component, said third bypass switch having an open mode, and said bypass switch having a closed mode for bypassing the third current sensing component and conducting current provided by the third input channel for energizing the lamp; wherein said controller is connected to the first, second, and third current sensing components and the first, second, and third bypass switches, said controller identifying the input channel that is providing current as a function of the first, second, and third measurable signals and for controlling the mode of the first, second, and third bypass switches based on the identified input channel wherein the controller controls each bypass switch to operate in the closed mode when the input channel connected to said bypass switch is the identified channel and wherein the controller controls each bypass switch to maintain the open mode when the input channel connected to said bypass switch is not the identified channel.

8. The device of claim 3 further comprising:

a third channel being selectively connected to the power source for providing current to an output device for operating said output device;

a third current sensing component connected to the third input channel between the power source and the output device, said third current sensing component producing a measurable third signal as a function of current provided by the third input channel; and a third bypass switch connected to the third input channel in parallel with the third current sensing component, said third bypass switch having an open mode, and said bypass switch having a closed mode for bypassing the third current sensing component and conducting current provided by the third input channel for operating the output device;

wherein said controller is connected to the first, second, and third current sensing components and the first, second, and third bypass switches, said controller identifying the input channel that is providing current as a function of the first, second, and third measurable signals and for controlling the mode of the first, second, and third bypass switches based on the identified input channel wherein the controller controls each bypass switch to operate in the closed mode when the input channel connected to said bypass switch is the identified channel and wherein the controller controls each bypass switch to maintain the open mode when the input channel connected to said bypass switch is not the identified channel.

9. The device of claim 8 wherein the output device comprises at least one of the following devices: a windshield wiper control device, a windshield washer device, and a turn signal device.

10. The device of claim 8 wherein the lamp comprises at least one or more vehicular headlamps and the output device is one or more lamps for a vehicular accessory.

11. The device of claim 3 wherein the first current sensing component comprises at least one of the following types of current sensing components: a resistor, a diode, and a transformer.

12. The device of claim 3 wherein the second current sensing component comprises at least one of the following types of current sensing components: a resistor, a diode, and a transformer.

13. The device of claim 3 wherein the first and second current sensing components each include a diode for providing reverse polarity protection from current flowing from a cathode side of said diode toward the power source.

14. The device of claim 3 wherein the first bypass switch is a p-type metal-oxide-semiconductor field-effect transistor (MOSFET) and wherein the second bypass switch is a p-type metal-oxide-semiconductor field-effect transistor (MOSFET).

15. The device of claim 14 wherein the first current sensing component is an intrinsic body diode associated with said first bypass switch and wherein the first current sensing component is an intrinsic body diode associated with said second bypass switch.

16. The device of claim 3 wherein the lamp is one or more high-intensity discharge (HID) lamps in a vehicular headlamp system.

17. The device of claim 3 wherein the lamp is one or more light emitting diodes (LED) in a vehicular headlamp system.

18. A device used with a direct current power source for energizing a vehicular headlamp, said device comprising:
a low beam input channel selectively connected to a power source for providing current to the headlamp for energizing a low beam element of said headlamp;
a high beam input channel selectively connected to the power source for providing current to the headlamp for energizing a high beam element of said headlamp;
a low beam current sensing component connected to the low beam input channel between the power source and the headlamp, said low beam current sensing component producing a low beam measurable signal as a function of current being provided by the low beam input channel;
a high beam current sensing component connected to the high beam input channel between the power source and the headlamp, said high beam current sensing component producing a high beam measurable signal as a function of current being provided by the high beam input channel;
a low beam bypass switch connected to the low beam input channel in parallel with the low beam current sensing component, said low beam bypass switch having an open mode, and said bypass switch having a closed mode for bypassing the low beam current sensing component and conducting the current being provided by the low beam input channel for energizing the low beam headlamp element;
a high beam bypass switch connected to the high beam input channel in parallel with the high beam current sensing component, said bypass switch having an open mode, and said bypass switch having a closed mode for bypassing the high beam current sensing component and conducting the current being provided by the high beam input channel for energizing the high beam headlamp element; and
a controller connected to the low beam and high beam current sensing components and the low beam and high beam bypass switches, said controller identifying the input channel that is providing current to the headlamp as a function of the low beam and high beam measurable signals and for controlling the mode of the low beam and high beam bypass switches based on the identified input channel wherein the controller operates each bypass switch in the closed mode when the input channel connected to said bypass switch is the identified channel and wherein the controller maintains each bypass switch in the open mode when the input channel connected to said bypass switch is not the identified channel.

19. The device of claim 18 wherein said headlamp includes a plurality of light emitting diodes (LEDs) and wherein said low beam element includes a first set of one or more of said LEDs and said high beam element includes a second set of one or more of said LEDs, said first and second sets being different.

20. The device of claim 18 wherein the headlamp includes a driver side headlamp and a passenger side headlamp.

21. The device of claim 18 wherein the controller includes a first controller input, a second controller input, and a controller output, said first controller input being connected to the low beam current sensing component for receiving the low beam measurable signal, said second controller input connected to the high beam current sensing component for receiving the high beam measurable signal, said controller output connected to the low beam and high beam bypass switches for providing a single mode control signal to control the mode of said bypass switches, and said device further comprising an inverting component connected between the controller and the low beam bypass switch, said inverting component inverting the mode control signal provided to the low beam bypass switch.

22. The device of claim 21, further comprising:
a low beam over voltage protection component connected between the inverter and the low beam bypass switch for regulating the inverted mode control signal for providing to the low beam bypass switch via the controller; and
a high beam over voltage protection component connected between the controller and the high beam bypass switch for regulating the mode control signal for providing to the low beam bypass switch via the controller.

23. The device of claim 18 wherein the first and second current sensing components each include a diode for providing reverse polarity protection from current flowing from a cathode side of said diode toward the power source.

* * * * *